(12) United States Patent
Udovydchenkov et al.

(10) Patent No.: US 10,305,677 B2
(45) Date of Patent: May 28, 2019

(54) SYSTEMS AND METHOD FOR ESTIMATING CLOCK DRIFT IN UNDERWATER ACOUSTIC INSTRUMENTS

(71) Applicant: THE MITRE CORPORATION, McLean, VA (US)

(72) Inventors: Ilya A. Udovydchenkov, Falmouth, MA (US); Ballard J. Blair, Kaneohe, HI (US); Ralph A. Stephen, Falmouth, MA (US)

(73) Assignee: THE MITRE CORPORATION, McLean, VA (US)

( * ) Notice: Subject to any disclaimer, the term of this patent is extended or adjusted under 35 U.S.C. 154(b) by 0 days.

(21) Appl. No.: 16/024,332

(22) Filed: Jun. 29, 2018

(65) Prior Publication Data

US 2019/0007195 A1 Jan. 3, 2019

Related U.S. Application Data

(60) Provisional application No. 62/526,797, filed on Jun. 29, 2017.

(51) Int. Cl.
*H04L 7/04* (2006.01)
*H04L 25/02* (2006.01)
(Continued)

(52) U.S. Cl.
CPC ............ *H04L 7/048* (2013.01); *H04B 13/02* (2013.01); *H04L 7/0087* (2013.01);
(Continued)

(58) Field of Classification Search
CPC ..... H04L 7/048; H04L 7/0087; H04L 25/024; H04L 27/22; H04L 7/0337; H04L 7/0334;
(Continued)

(56) References Cited

U.S. PATENT DOCUMENTS 6,249,321 B1 * 6/2001 Bae .................. H04N 5/211
348/607
7,668,047 B2 2/2010 Ray et al.
(Continued)

FOREIGN PATENT DOCUMENTS

WO 2015/092342 6/2015

OTHER PUBLICATIONS

Amini, A. et al. (2016) "Jot inversion of water velocity and node position for ocean-bottom node date," In SEG Technical Program Expanded Abstracts, Society of Exploration Geophysicists, pp. 5490-5494.

Benazzouz, O. et al. (2015) "Correction of Ocean-Bottom Seismometers random clock draft artifacts," In SEG Technical Program Expanded Abstracts, Society of Exploration Geophysicists, pp. 4786-4789.

*Primary Examiner* — Ted M Wang
(74) *Attorney, Agent, or Firm* — Morrison & Foerster LLP

(57) ABSTRACT

A system and method for estimating clock drift in underwater instruments is provided. The method can include transmitting a signal from a source to a plurality of underwater receivers or a single receiver. Upon recovery of the underwater receivers, an initial sampling frequency value can be used to generate received data waveforms from data stored on each underwater device. The generated received waveforms can be used to generate a channel estimate for each receiver, and the channel estimates can be used to provide an estimate of the source motion during the transmission. The estimated source motion can then be used to estimate the clock drift.

22 Claims, 11 Drawing Sheets

(51) Int. Cl.
*H04L 27/22* (2006.01)
*H04B 13/02* (2006.01)
*H04L 7/00* (2006.01)
*G01V 1/38* (2006.01)

(52) U.S. Cl.
CPC ............ H04L 25/024 (2013.01); H04L 27/22 (2013.01); *G01V 1/3852* (2013.01); *G01V 2200/12* (2013.01)

(58) Field of Classification Search
CPC ....... H04L 7/033; H04L 7/0029; H04B 13/02; H04B 12/02; H03L 7/091; G01V 1/3852; G01V 2200/12
See application file for complete search history.

(56) References Cited

U.S. PATENT DOCUMENTS

| | | |
|---|---|---|
| 8,995,222 B2 | 3/2015 | Xia et al. |
| 2011/0273958 A1* | 11/2011 | Xia ...................... G01V 1/3817 367/21 |
| 2015/0256972 A1* | 9/2015 | Markhovsky ........... H04W 4/90 455/456.1 |
| 2016/0091625 A1 | 3/2016 | Ikegami et al. |
| 2016/0202380 A1 | 7/2016 | Olivier |
| 2017/0017006 A1 | 1/2017 | Noss |

\* cited by examiner

SYSTEMS AND METHOD FOR ESTIMATING CLOCK DRIFT IN UNDERWATER ACOUSTIC INSTRUMENTS

CROSS-REFERENCE TO RELATED APPLICATION

This application claims the benefit of U.S. Provisional Application No. 62/526,797, filed Jun. 29, 2017, the entire contents of which are incorporated herein by reference.

FIELD OF THE DISCLOSURE

This disclosure relates to systems and methods for estimating clock drift in underwater acoustic instruments using channel estimation results. These systems and methods can be used to estimate the clock drift to improve the fidelity and minimize errors in interpreting data collected by underwater instruments.

BACKGROUND OF THE DISCLOSURE

Underwater acoustic instruments can be deployed in oceans or other bodies of water and can be configured to receive signals from an acoustic source. Examples of underwater acoustic instruments can include hydrophone modules, ocean bottom seismometers, current profilers, or various autonomous underwater vehicles such as, for example, seagliders. Alternatively, acoustic instruments can be parts of more complex systems such as naval submarines, research submersibles, etc. These instruments are designed to take measurements of underwater pressure waves transmitted by various sources. All collected data samples should be accurately associated with time stamps at which the data were collected for correct interpretation and post-processing. The knowledge of accurate time stamps for the collected data can be important in a variety of contexts. Such contexts could include surveillance, communications, remote sensing, and petroleum exploration, as examples. Being able to accurately determine the precise time and location the data were acquired can be important to ensuring that the data are interpreted accurately.

Clock drift can lead to errors in interpreting the data received by an underwater instrument. For instance, in sonar applications, clock drift can lead to errors in estimating the range or bearing of a target. In the context of petroleum exploration, images of the subsurface structure, including oil- and gas-bearing formations, are improved with better timing and location information. In the context of communications applications, the synchronization of the received waveform could be inaccurate leading to errors in interpreting the received data (i.e., resulting in increased bit error rates).

Conventionally, models of clock drift can be employed to correct for errors associated with clock drift. Various models of clock drift, for example, models that assume that the frequency of the clock is offset by a constant value or drifts linearly over time, could be used to correct the received data for errors associated with clock drift. However, the accuracy of the models can be questionable and can still cause errors in interpreting the data received by an underwater instrument. Also, generally clocks do not drift monotonically. They can speed-up or slow-down in an arbitrary and unpredictable fashion throughout the deployment.

Thus, a more accurate method of estimating clock drift of an underwater instrument is desirable in order to further increase the fidelity of the data collection and minimize any errors caused by clock drift.

SUMMARY OF THE DISCLOSURE

Accordingly, systems and methods for estimating clock drift in underwater acoustic instruments using propagation channel analysis are provided. In one example, a channel estimate can be obtained by processing the received data containing a known transmitted waveform. The generated channel estimate and its variations in time can then be used to estimate the source motion. The error in the source position estimation can be representative of the effects of clock drift on received data. The sampling frequency can be changed during post-processing, and the errors in the source displacement can be recalculated. This process can be repeated until the sampling frequency is adjusted to a point where the errors are lower than a pre-determined tolerance. In this way, the final sampling frequency is a more accurate representation of the actual clock frequency than the nominal frequency of the clock and errors associated with clock drift can be minimized.

DETAILED DESCRIPTION

Figure 1:
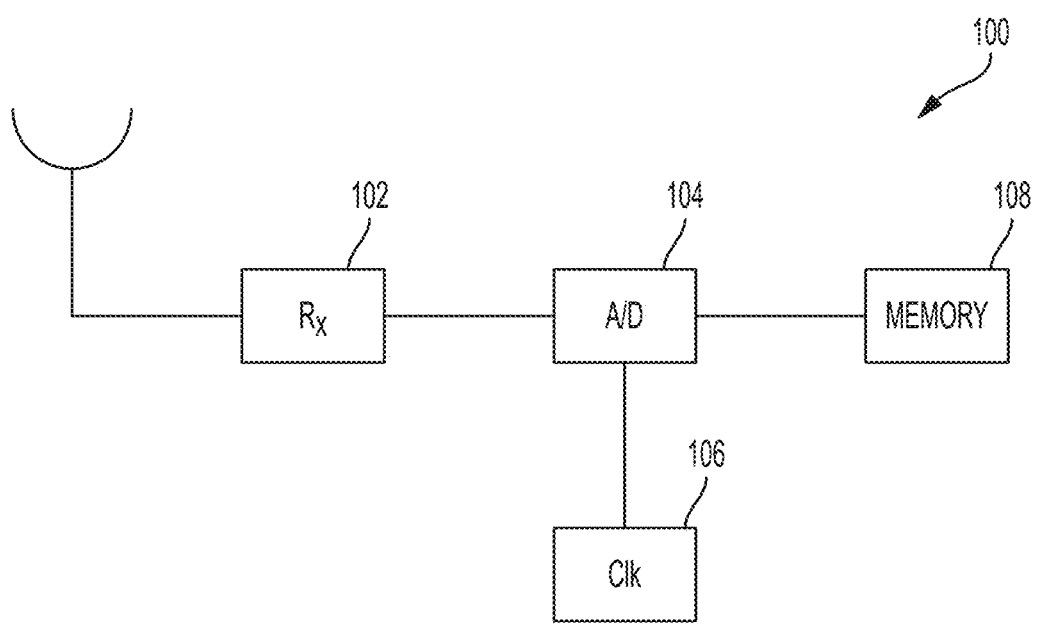
FIG. 1 illustrates an exemplary underwater acoustic instrument according to examples of the disclosure.

In the following description of the disclosure and embodiments, reference is made to the accompanying drawings in which are shown, by way of illustration, specific embodiments that can be practiced. It is to be understood that other embodiments and examples can be practiced and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present invention include process steps and instructions described herein in the form of an algorithm. It should be noted that the process steps and instructions of the present invention could be embodied in software, firmware, or hardware, and, when embodied in software, could be downloaded to reside on and be operated from different platforms used by a variety of operating systems.

The present invention also relates to a device for performing the operations herein. This device may be specially constructed for the required purposes, or it may comprise a general-purpose computer selectively activated or reconfigured by a computer program stored in the computer. Such a computer program may be stored in a non-transitory, computer-readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application-specific integrated circuits (ASICs), or any type of media suitable for storing electronic instructions and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

Described herein are systems and methods for estimating and minimizing errors associated with clock drift in underwater instruments. The systems and methods described herein can be used to minimize errors in interpreting acoustic data collected underwater.

FIG. 1 illustrates an exemplary underwater acoustic instrument according to examples of the disclosure. The system 100 can include a receiver 102 designed to collect underwater acoustic data. The receiver 102 can be coupled to an analog-to-digital converter 104 that is configured to convert received analog waveforms into digital samples. To convert the received analog waveforms into digital samples, the analog-to-digital converter 104 can employ a clock signal 106 that can be used to time the moments at which each sample of the waveform is taken. Thus, in one example, at the beginning of each cycle of the clock signal, the analog-to-digital converter can sample the analog waveform, convert the value of the waveform at the moment of the sample into a digital representation, and store the digital representation into a memory 108.

Since many underwater instruments are generally taking measurements below the ocean surface, the instruments are generally deployed for the entire duration of the mission, and the data stored in the memory 108 is not retrieved until these instruments are brought to the surface. When an instrument is brought to the surface, the memory can be read and, using the known sampling frequency (based on the clock frequency) of the analog-to-digital converter and the data stored in memory, the waveform received by the instrument can be reconstructed.

However, during the life of the clock, the actual frequency of the clock's oscillator may drift over time. The drift in the clock's oscillator signal over time may lead to an inaccurate sampling frequency being used to reconstruct the waveform, which can lead to inaccuracy in the reconstruction of the waveform. Various factors that can lead to clock drift include the ambient environmental changes (such as temperature or pressure variations), the type of oscillator used in the clock, the stability of the clock's power source, and the general quality of the clock.

Figure 2:
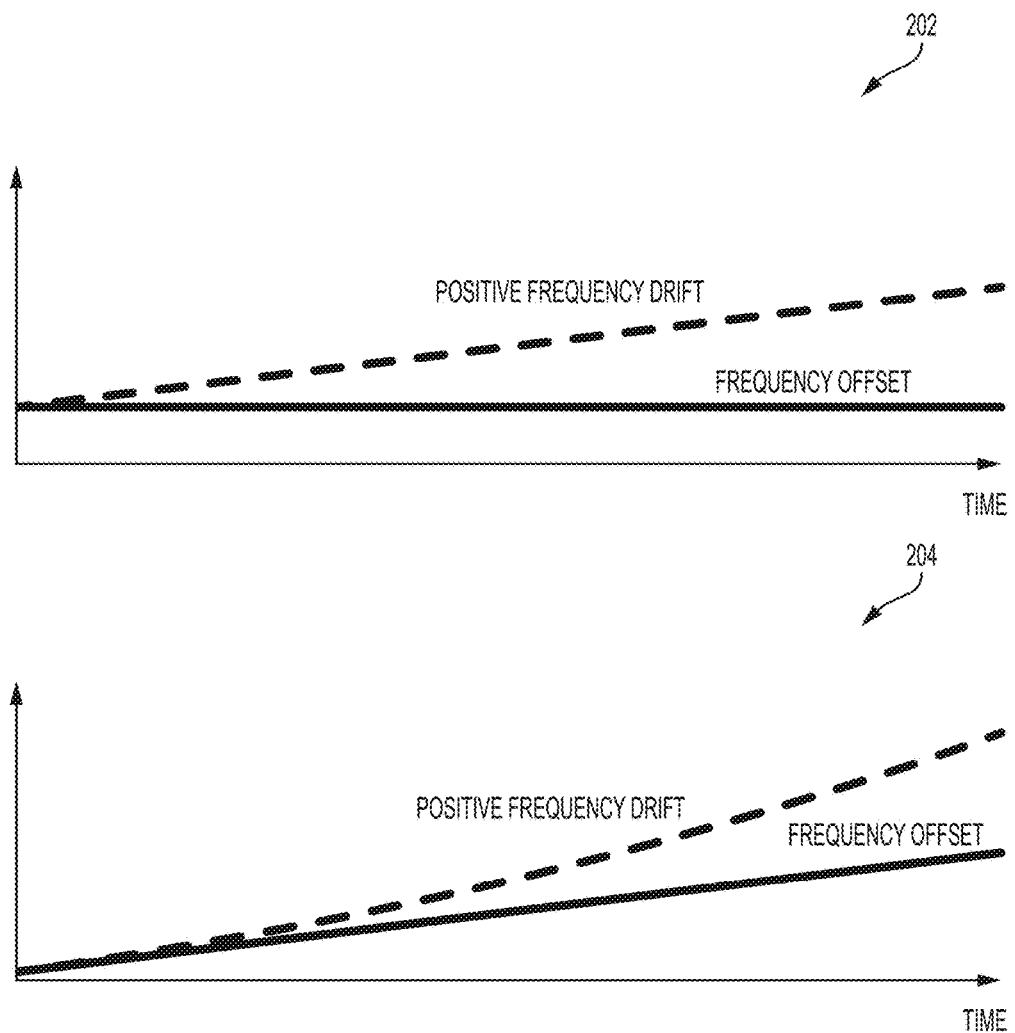
FIG. 2 illustrates two exemplary clock drift models over time according to examples of the disclosure.

FIG. 2 illustrates an exemplary clock drift over time according to examples of the disclosure. Graph 202 can represent the constant frequency offset of the clock's oscillator as a function of time. Optimally, this frequency offset should be zero. In other words, the sampling frequency of the clock should be equal to the nominal value and should not change over time. However, and also as shown in graph 204, the clock can also experience frequency drift over time. Frequency drift can indicate that the clock's oscillator frequency is changing as a function of time. Whereas frequency offset can remain constant over time, the frequency drift of the clock over time can be progressively increasing during the lifespan of the clock. Furthermore, frequency drift can be both positive or negative meaning the frequency of the clock can either increase or decrease over time. In many examples, the clock drift can be random, wherein the clock's oscillator rate can speed-up or slow-down unpredictably.

Graphs 202 and 204 can illustrate the associated time error versus time with respect to the frequency drift illustrated in respective subpanels. Since time error can accumulate over time in the presence of frequency drift and offset, the frequency offset can lead to a linear accumulation of time error versus time, whereas the positive linear frequency drift can lead to a quadratic accumulation of time error versus time.

In order to estimate the clock drift in underwater instruments during deployment, according to examples of this disclosure, a known source, configured to transmit a known data sequence, can be used to send signals to a plurality of receivers. The data that is received by the receivers in response to the transmissions from the known source can be analyzed, and the clock drift can be estimated based on the analysis as discussed in detail below.

Figure 3:
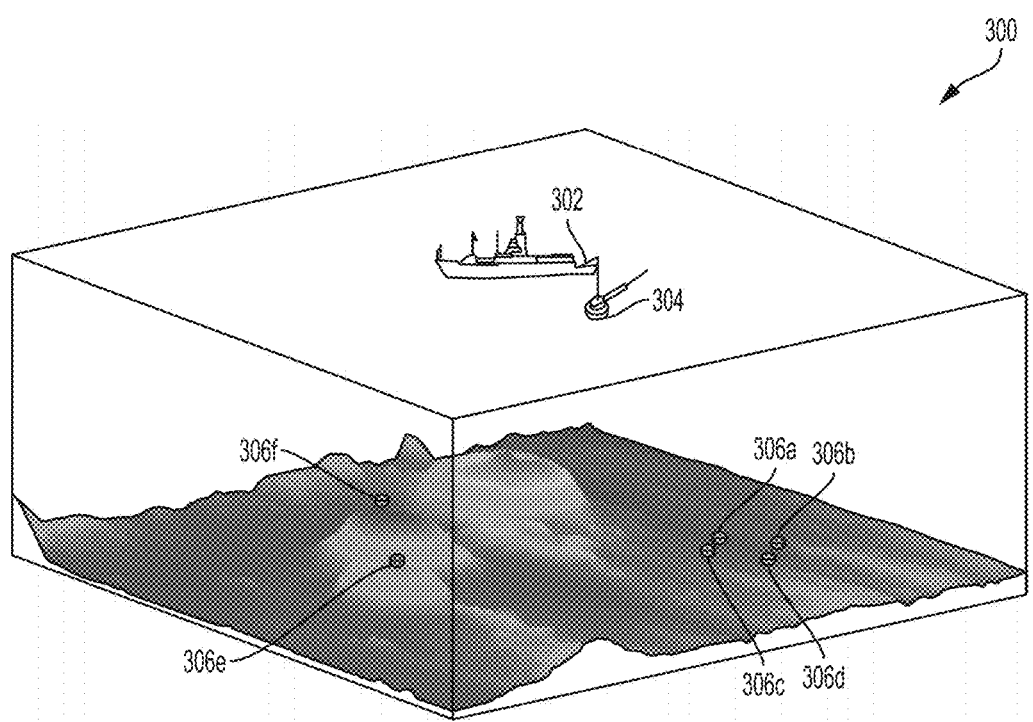
FIG. 3 illustrates an exemplary clock drift estimation system according to examples of the disclosure.

FIG. 3 illustrates an exemplary clock drift estimation system according to examples of the disclosure. The system 300 can include a source 304 that can be attached to a ship 302, mounted on a buoy or a floating platform either on the water surface or submerged. The source can also be on an autonomous underwater vehicle (AUV) with its mission pre-programmed before the deployment. The attachment between the source 304 and the ship 302 can mean that any motion exhibited by the ship can also transfer to the motion of the source by a rigid rod, flexible cable, or other physical connection between the source and the ship. As will be discussed below in detail, source 304 can transmit a known sequence of data to a plurality of underwater receivers 306a-f. In one example, source 304 can be an acoustic source that generates acoustic waves that are to be transmitted through the ocean to the plurality of underwater receivers 306a-f.

Receivers 306a-f can be included in underwater instruments as described above with respect to FIG. 1 and can include clock elements that may be subject to drift over the deployment of the underwater instrument as described above. The receivers 306a-f can be deployed at various locations throughout the seafloor. In the example of FIG. 3, receivers 306a-d can be located on the bottom of the ocean (i.e., the sea floor), while receivers 306e-f can be located on seamounts. In one example, the depth to the bottom of the ocean (i.e., the location of receivers 306a-d) can be approximately 5 km, while the depth of the receivers located on the underwater mountains can be 4 km.

Figure 4:
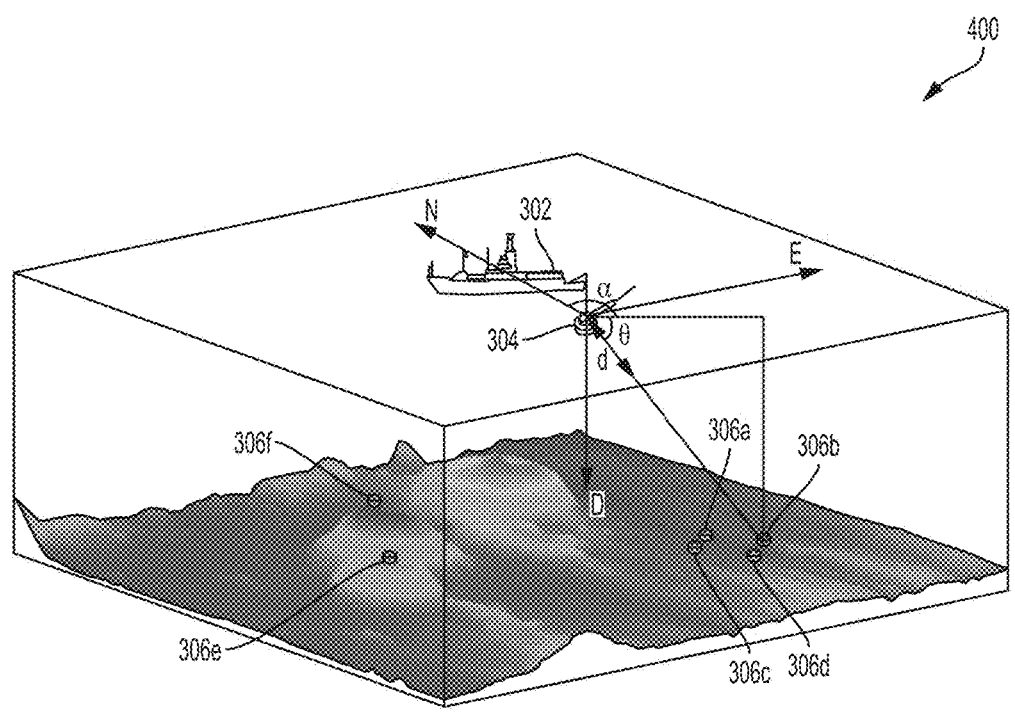
FIG. 4 illustrates an exemplary geometry of a source motion with respect to a plurality of underwater receivers according to examples of the disclosure.

In order to better understand the method for estimating clock drift, the geometry between the source 304 and the receivers 306a-f can be defined. FIG. 4 illustrates an exemplary geometry of a source motion with respect to a plurality of underwater receivers according to examples of the disclosure. As illustrated in the figure, the three-dimensional position of the source 304 can be described in terms of three local orthogonal directions: North, East, and Down, wherein Down can refer to the depth of the source below ocean surface.

The geometry of the proposed system can be further illustrated by a set of eigenrays connecting the source and the receivers. The eigenrays can represent geometric paths underwater, along which the acoustic energy propagates from the source to the receivers. Generally, for each source-receiver pair, multiple eigenrays exist. The eigenrays could be separated into two classes: purely refracted by the gradients of the sound speed in the ocean and those that reflect from the oceanic boundaries (surface and bottom). For a system that employs multiple receivers, the focus is made on the direct arrival, which belongs to the first class of eigenrays. The displacement of the source 304 along such an eigenray towards a receiver 306b is denoted d in FIG. 4. For each source-receiver pair the displacement of the source along the corresponding direct arrival is denoted by $d_i$. Each of these displacements $d_i$ can be resolved into its component vectors N, E, D (North, East, and Down) using the three-dimensional coordinate system described above. Equation (1) below shows the mathematical relationship between the displacement along an eigenray and its component vectors.

$$N \cos \theta \cos \alpha + E \cos \theta \sin \alpha + D \sin \theta = d, \quad (1)$$

where d is the displacement along the eigenray, $\alpha$ is the azimuthal departure angle as illustrated in FIG. 4, and $\theta$ is the grazing launch angle as illustrated in FIG. 4. As discussed above, Eq. (1) can be written for each receiver. Thus, for each i-th receiver, the mathematical relationship between the displacement along the corresponding eigenray $d_i$ and its component vectors N, E, D (also a function of time) can be described by Eq. (2) below.

$$(\cos\theta_i \cos\alpha_i \quad \cos\theta_i \sin\alpha_i \quad \sin\theta_i) \begin{pmatrix} N \\ E \\ D \end{pmatrix} = d_i \quad (2)$$

While N, E, D, and $d_i$ can be functions of time, the azimuthal departure angle and the grazing launch angle can be assumed to be constants since source displacements are usually much smaller than any source-receiver separation.

Figure 5:
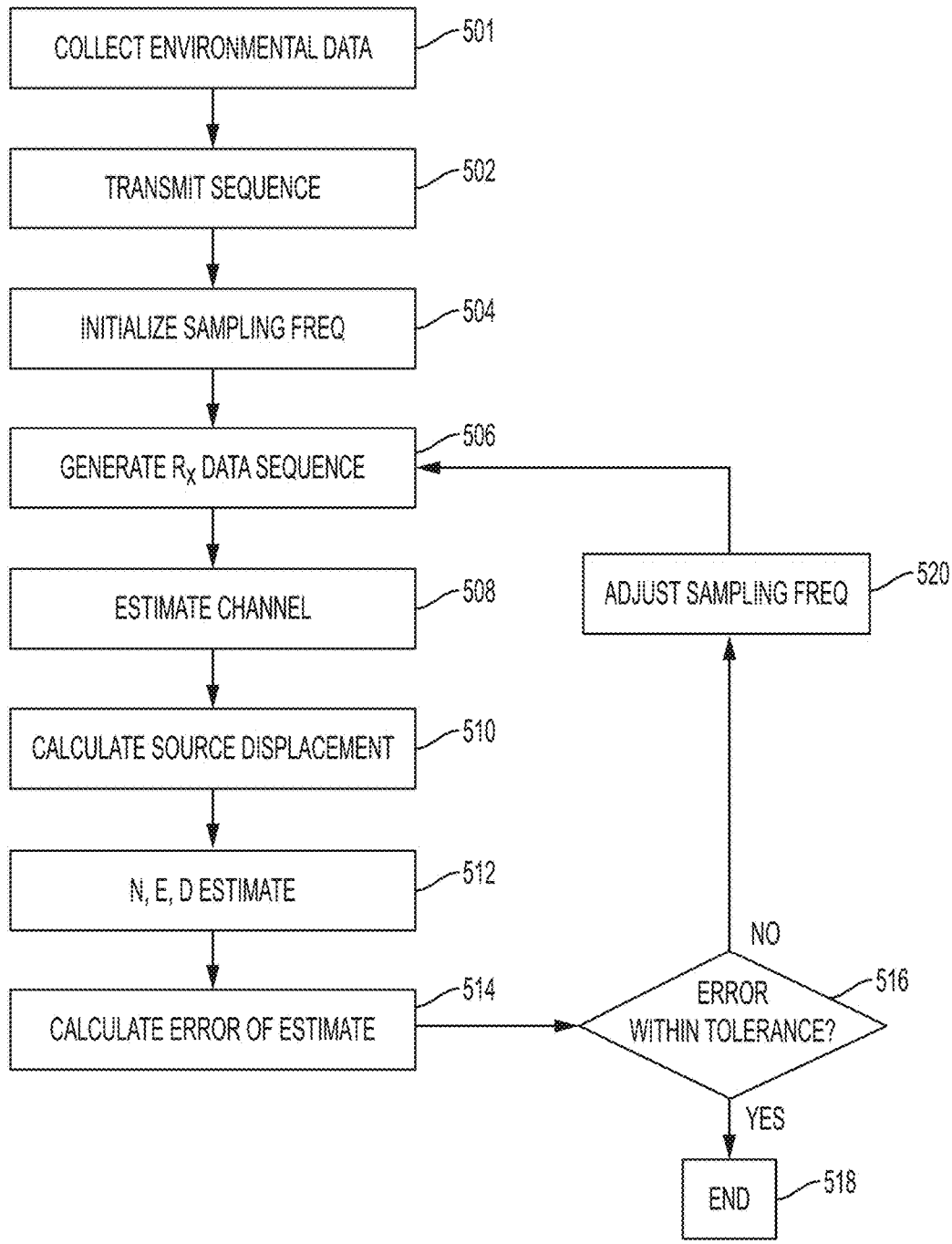
FIG. 5 illustrates an exemplary method for estimating clock drift of underwater devices according to examples of the disclosure.

As will be discussed in detail below, knowledge of $d_i(t)$ due to movement of the source 304 can be used to estimate clock drift. FIG. 5 illustrates an exemplary method for estimating clock drift of underwater devices according to examples of the disclosure. The method 500 illustrated in FIG. 5 can be employed to minimize the error in signal reconstruction caused by clock drift as discussed above. In describing the method 500, reference will be made to FIGS. 3 and 4 to illustrate the various components of the system and their relation to the method depicted in FIG. 5.

The method 500 can begin at step 501, during which the environmental data is collected. Specifically, it can be necessary to estimate the sound speed profile as a function of depth. In one or more examples, estimating the sound speed profile can be done by collecting conductivity and temperature data as a function of pressure and then calculating the sound speed profile as a function of depth using empirical formulas. At this point a ray-tracing model can be used to estimate the geometry of eigenrays connecting the source and receivers. The results of the ray-tracing model are also used to estimate $\alpha$—the azimuthal departure angle as illustrated in FIG. 4; and $\theta$—the grazing launch angle as illustrated in FIG. 4. After confirming the existence of the necessary eigenrays, the process continues with the step 502, where the source (i.e., source 304 of FIG. 3) can transmit a known waveform to the receivers 306a-f. In one example, at step 502, the source 304 can transmit a waveform containing binary phase shift keying (BPSK) digital sequences. In one example, the so-called M-sequence, 1023-digits long, can be transmitted. However, the disclosure should not be seen as limited to that length, modulation scheme used, or the type of the data sequence. M-sequences can be used in a variety of applications to improve the signal-to-noise ratio. By using M-sequences rather than transmitting a short and loud pulse, the source 304 can transmit a waveform that is relatively quiet, long in duration, and can employ special processing techniques such as matched filtering or pulse compression to infer the results from the transmission of a short and loud pulse. M-sequences also exhibit a special property, which is the peak of the auto-correlation function is equal to the length of the sequence, while any cross-correlation with any nonzero lag is equal to −1. In one example, the M-sequences can be sent at a data rate such that each digit consists of two cycles of the carrier frequency. The carrier frequency of the source 304 can vary depending on the source design, the geometry of the system, and environmental conditions, but in some examples included carrier frequencies of, 77.5, 102.3, 155, 204.6, and 310 Hz. This disclosure, however, should not be seen as limited to the above-mentioned frequencies, nor should the disclosure been seen as limited to M-sequences. Any data sequence with any modulation scheme, or any other waveform that might or might not contain digital data that allows for channel estimation on the time scales that are shorter than the characteristic time scale of the source motion can be suitable.

The data transmitted by the source 304 can be received at the plurality of receivers 306a-f. When the receivers 306a-f are retrieved from the ocean, the memory associated with each receiver can be read to analyze the signals received from the source 304 during the transmission. This analysis can be performed as part of a post processing analysis, meaning after the receivers have been retrieved from the ocean. In order to analyze the received data, at step 504, an initial sampling frequency is selected. The initial sampling frequency can be, in some examples, the nominal (i.e., with no drift) frequency of the clock located in the underwater instrument that contained the receiver. As discussed above, each clock in the underwater instruments can be selected to operate at a particular frequency. At step 504, that selected frequency can be set as the initialized frequency (and will later be adjusted as discussed below).

Once an initial frequency has been selected at step 504, the process can move to step 506, wherein a received data sequence can be generated. The memory of each underwater device can store a single digital value for each sample collected from the analog-to-digital converter. By selecting the initial sampling frequency at step 504 (or adjusting the sampling frequency at step 520), an output data waveform can be generated based on the sampling frequency and the values stored in the memory of the underwater device.

Figure 6:
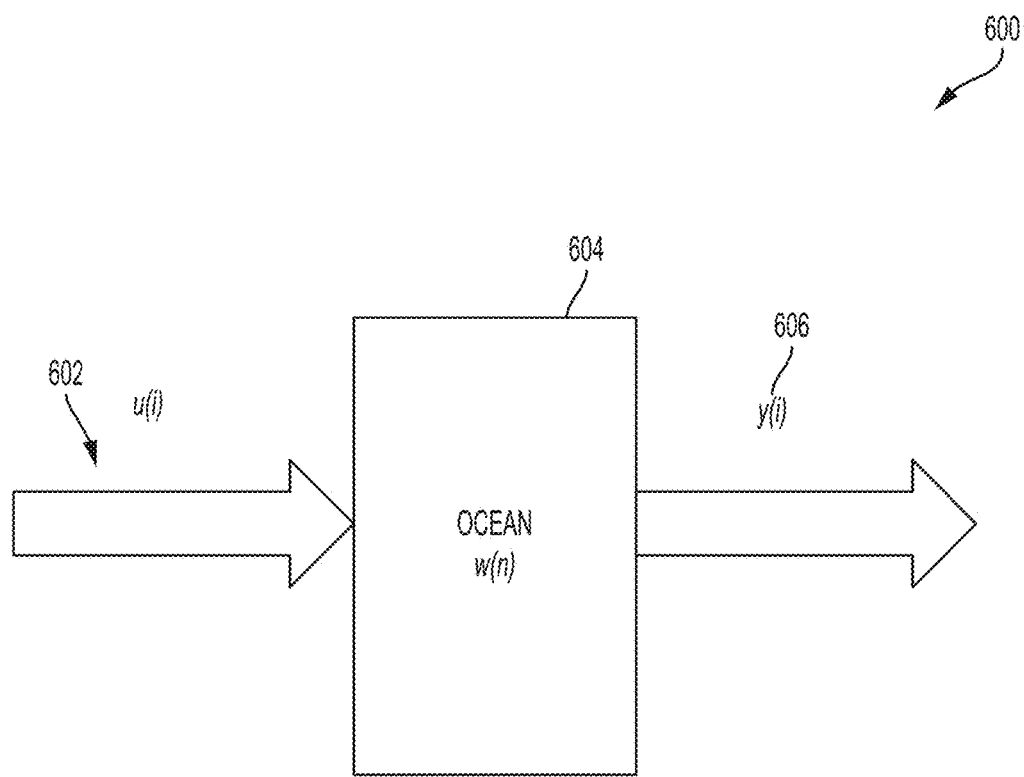
FIG. 6 illustrates an exemplary channel model according to examples of the disclosure.

After generating the output waveform at step 506, the process can move to step 508, wherein an estimate of the channel is generated. Channel estimation can refer to characterizing the effect that the channel (i.e., the transmission medium and any associated noise) has on a transmitted data waveform. FIG. 6 illustrates an exemplary channel model according to examples of the disclosure. The model 600 can include an input data stream u(i) depicted at 602. The input data stream can represent the data transmitted by the source 304 and can be represented by Eq. (3) below.

$$u(i)\text{–input vector at time } i: [u(i), u(i-1), \ldots, u(i-M+1)]^T \quad (3)$$

The model 600 can include an output data stream y(i) depicted at 606, which can mathematically represent the generated output data stream generated at step 506. The channel can be represented by w(n), a tap-weight vector at time n using Eq. (4) below.

$$w(n)\text{–tap-weight vector at time } n: [w_0(n), w_1(n), \ldots, w_{M-1}(n)]^T \quad (4)$$

The output data stream generated at step 506 can be represented in terms of the channel model and the transmitted data stream using Eq. (5) below.

$$y(i) = w_H(n)u(i) \quad (5)$$

Hypothesizing a linear relationship between y(i) (i.e., the measured data) and u(i) (i.e., the transmitted binary M-sequence), the channel w(n) can be estimated. Specifically, the channel response w(n) can be estimated using a conventional recursive least-squares (RLS) estimation process. To generate an RLS estimation of the channel response, a cost function associated with the estimated channel response (shown in Eq. (6)) can be minimized.

$$\varepsilon(n) = \Sigma_{i=1}^n \lambda^{n-i} |e(i)|^2 + \delta \lambda^n w^H(n) w(n), \quad (6)$$

process $\delta$ can refer to a regularization parameter, and $$\frac{1}{1-\lambda}$$

can represent the memory of the process. The optimal w(n) that minimizes $\varepsilon$(n) can also satisfy Eq. (7) below.

$$\Phi(n)\hat{w}(n) = z(n), \quad (7)$$

where $\Phi$(n) can represent the time-average correlation matrix of the tap-input vector (represented by Eq. (8) below) and z(n) can represent the time-average cross-correlation between tap input and the desired response (represented by Eq. (9) below).

$$\Phi(n) = \Sigma_{i=1}^n \lambda^{n-i} u(i) u^H(i) + \delta \lambda^n \quad (8)$$

$$z(n) = \Sigma_{i=1}^n \lambda^{n-i} u(i) d^*(i) \quad (9)$$

By transmitting an M-sequence from the source 304 and applying the channel estimation techniques above, the calculated channel estimation can be adaptive, and the channel can be tracked on a finer time scale than the duration of the entire M-sequence. As in the above example, if the entire M-sequence lasted approximately 30 seconds, and the amount of time needed to transmit one digit is approximately 50 milliseconds, using the above channel estimate, channel variations can be tracked on a time scale equal to the duration of one digit (i.e., 50 milliseconds).

After generating the channel estimate, the displacement of the source $d_i$ along each eigenray is computed at step 510. The main assumption for this calculation is that the channel variations observed are primarily due to the motion of the source. This is achieved by selecting appropriate frequencies and bandwidths for the source and selecting the duration of the transmission long enough to properly average environmental fluctuations. Thus, returning to the example of FIG. 4, if the source 306 shifted position during the transmission of the M-sequences (for instance due to motion of the ship), the distance between the source 304 and the receivers 306a-f may increase or decrease. This increase or decrease can be reflected by displacement of the source $d_i$ along each eigenray. First, changes in travel time can be estimated from the channel model (generated using RLS method) by tracking the delay time of the peak amplitude of the direct arrival. To convert the changes in the delay time into displacement of the source along each eigenray, the calculated change in the delay time can be multiplied by the sound speed at the source.

The sound speed at the source can be calculated using values of conductivity, temperature, and pressure measured at the source. It is assumed that the sound speed at the source does not change significantly over the duration of the transmission. (If the sound speed at the source changes significantly, the change needs to be taken into account.) This assumption holds well for large horizontal displacement; however, it may break down if the vertical displacements (i.e., changes of the source's depth) are very large. If the source is connected to the ship, vertical displacements can be caused primarily by the ship's heave and are thus approximately the same amplitude as the vertical amplitude of the ship's motion, which is largely determined by the amplitude of surface waves.

After calculating the displacement of the source $d_i$ along each eigenray over time for each receiver at step 510, the process can move to step 512, wherein the North, East, and Down positions for each instant of time can be estimated. As discussed above, for each i-th receiver, the eigenray path length can be expressed by Eq. (2) reproduced below for convenience. For purposes of estimating the clock drift, the exact eigenray path length (and each source-receiver separation distance) is not needed. Instead, changes in the eigenray path length over time are needed for the purposes of clock drift estimation.

$$(\cos\theta_i\cos\alpha_i \quad \cos\theta_i\sin\alpha_i \quad \sin\theta_i) \begin{pmatrix} N \\ E \\ D \end{pmatrix} = d_i \quad (2)$$

As discussed above, for each receiver, the angles $\alpha$ and $\theta$ are known (they are estimated from the geometry, environmental data, and ray-tracing model), and $d_i$ for each i-th receiver have been estimated from the channel estimates. The only unknowns left in Eq. (2) are N, E, and D as a function of time. Since there are a plurality of receivers, N, E, and D, as a function of time, can be solved by combining the receivers to rewrite Eq. (2) into matrix form expressed in Eq. (10). Note that the knowledge of N, E, and D at t=0 is not needed. At time t=0, the N, E, D, can be assumed to be (0, 0, 0), and the deviations in the N, E, and D from their initial values can be estimated.

$$AX=B \quad (10)$$

Since there are three unknowns that are being solved for, if there are four or more receivers, as disclosed in the examples above, the system of equations represented by Eq. (10) is overdetermined and can be solved by solving the linear inverse problem. The solution X for Eq. (10) can be computed using a least squares method, which is represented by Eq. (11) below.

$$X^* = (A'A)^{-1}A'B \quad (11)$$

Once a least squares-based estimation of N, E, D has been calculated per step 512, the process can move to step 514 wherein an error (i.e., the misfit) of the estimation can be calculated. The misfit created by the least squares solution can allow for clock drift to be estimated. The misfit can be represented by Eq. (12) below.

$$Err = AX^* - B \quad (12)$$

Figure 7:
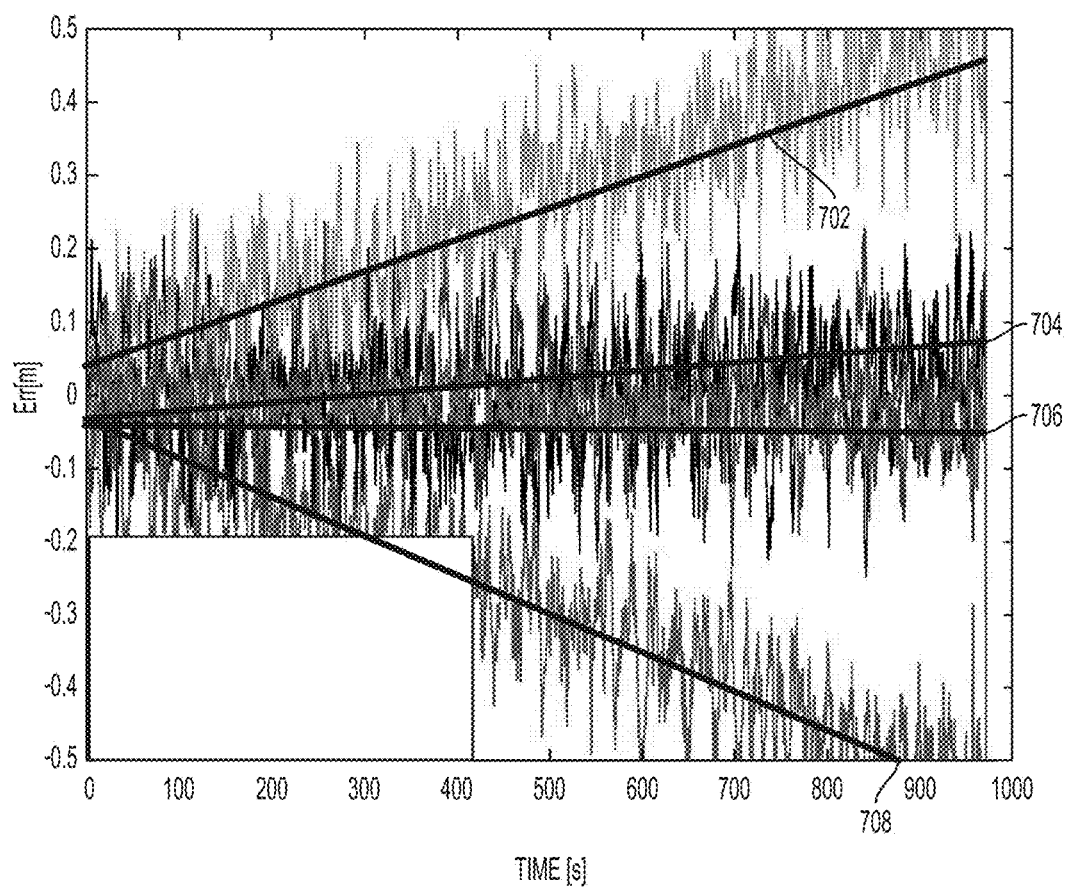
FIG. 7 illustrates an exemplary plot of an error signal for a plurality of receivers according to examples of the disclosure.

The error signal Err is a function of time and expressed as Err(t). Err(t) for each receiver can help to estimate the clock drift. FIG. 7 illustrates an exemplary plot of an error signal for a plurality of receivers according to examples of the disclosure. As shown in the graph 700, the error signal for each receiver of the plurality of receivers can be plotted as a function of time (see lines 702, 704, 706, and 708). Each line 702, 704, 706, and 708 can represent a linear fit to the actual data that is shown in the graph 700. Each line 702, 704, 706, and 708 can be characterized by a slope β.

The clock drift in each of the underwater devices can cause a gradual rise to the error signal Err(t) over time. As discussed above with respect to FIG. 2, a clock that exhibits frequency offset or drift over time can accumulate time error as a function of time. This phenomenon is reflected in the lines 702, 704, 706, and 708. Rather than having a constant error signal over time reflective of the misfit caused by the overdetermined system solution, each line 702, 704, 706, and 708 can exhibit a slope. The slope of the line can be indicative of the clock drift experienced by the clock of a particular receiver. Thus, a receiver whose error due to clock drift is minimal or has been minimized would be characterized by the smaller value of the slope β.

Once the error signal has been calculated for each receiver, the process can move to step 516, wherein a determination is made as to whether the slopes of the error signal of each receiver is within a desired tolerance. Looking at the example of FIG. 7, lines 702, 704, 706, and 708 can all appear to have a slope β. Line 702 can have a larger positive slope, while line 708 can have a larger negative slope in comparison to all other lines. Lines 704 and 706 can have a slope that is nearly zero, which can mean that the clocks associated with those receivers may not have drifted or the drift is so small that the method of FIG. 5 cannot perceive the drift.

At step 516, the process can determine the slope of the linear fit to each error plot of each receiver and determine whether the determined slope is within a pre-defined tolerance. The pre-defined tolerance can be a value set by a user or can be empirically determined and can represent the amount of error associated with clock drift that a user of the process is willing to tolerate.

If the slope of each error curve for each receiver is within the pre-defined tolerance, the process can be terminated at step 518. However, if one or more curves are not within a pre-determined tolerance, the process can move to step 520, wherein the sampling frequency that was used to generate the received data at step 506 is adjusted.

Once the sampling frequency is adjusted at step 520, the process can be repeated starting with step 506, wherein the channel is estimated assuming the new sampling frequency set at step 520 and a new error signal is calculated for each receiver using the new sampling frequency. The process can be repeated for as many iterations as it takes to get the slopes of each error signal for each receiver to within the pre-defined tolerance.

Figure 8:
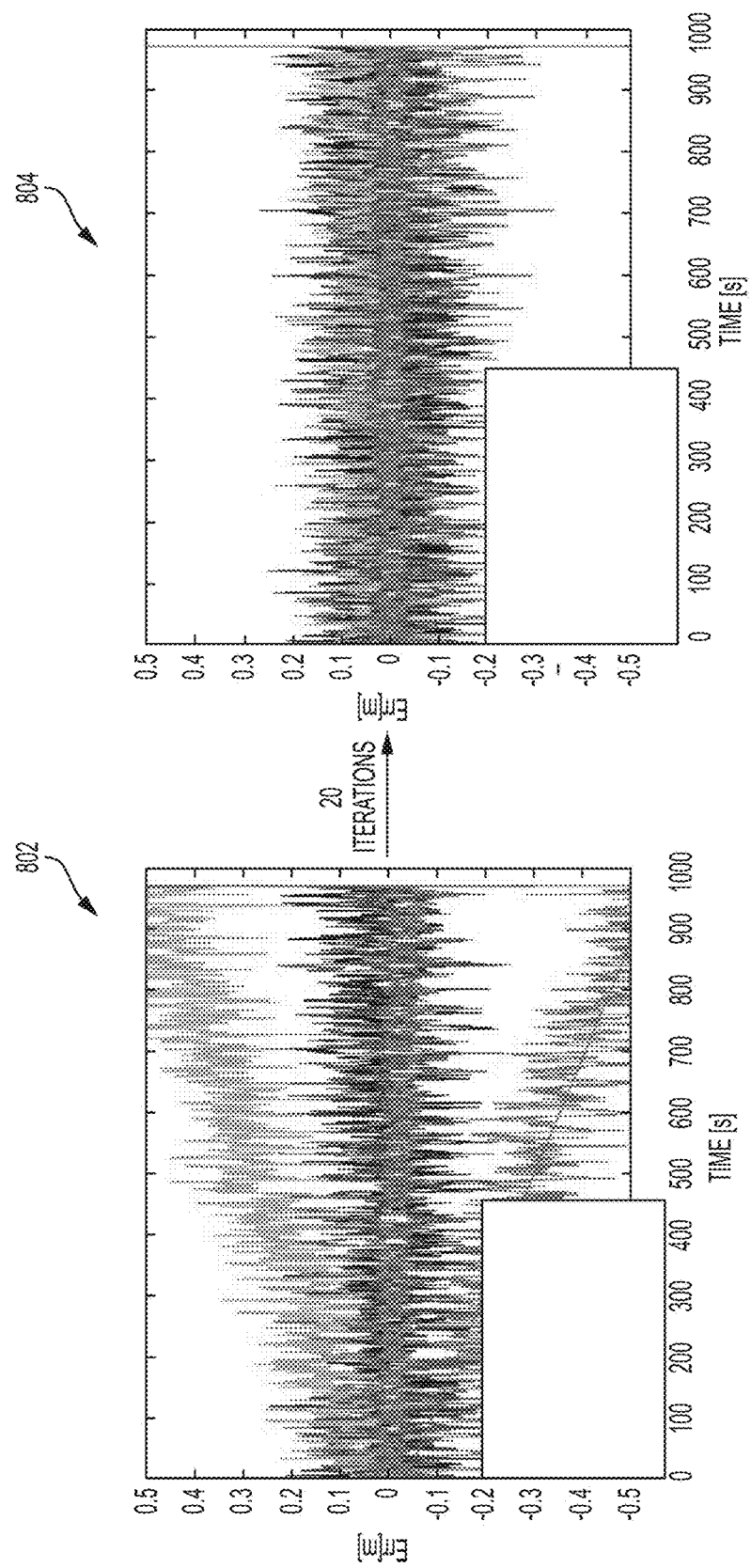
FIG. 8 illustrates an exemplary transformation of an error plot after multiple iterations of the clock drift estimation process according to examples of the disclosure.

FIG. 8 illustrates an exemplary transformation of an error plot after multiple iterations of the clock drift estimation process according to examples of the disclosure. Chart 802 is a copy of the chart shown in FIG. 7. Chart 804 can illustrate the change in the error plots of the six receivers after the process defined by FIG. 5 has been iterated upon the data of the receivers 20 times. As seen in chart 804, the slope of each error curve has flattened, indicating that the sampling frequency chosen for the twentieth iteration can closely approximate the drifted clock frequency of each receiver.

It is important to note that the sampling frequency chosen to produce chart 804 only represents an estimate of the clock's oscillator rate for a period of time, and that estimate of the clock's oscillator rate may not be valid over the lifetime of the clock. In one example, the estimate of the clock's frequency as illustrated in chart 804 may represent the frequency of the receivers' clocks during the transmission of a few M-sequences. The signals need not be transmitted continuously, but it should be noted that only a single (averaged) estimate for the clock drift is obtained over the entire duration of the transmission. The frequency at which the M-sequences should be transmitted can depend on how non-linear the clock drift may be. The total duration of the transmission required to obtain a reliable clock drift estimate depends on several factors, such as strength of oceanic fluctuations, geometry of the experiment, types and characteristics of signals being used, and the quality of the clock's oscillator. For instance, obtaining a reliable correction for an oscillator with the drift rate of 0.5 ppm (parts per million) would require longer transmission times than for the oscillator with the drift rate of 5 ppm.

Once the sampling frequency has been adjusted to a point where all slopes of the error curves are within the predetermined tolerance, the sampling frequency used to bring each error curve into tolerance can be used to process the data collected by each underwater instrument so as to generate accurate reconstructions of the output waveforms, wherein any error associated with clock drift is mitigated or at least minimized.

While the examples discussed above can yield accurate estimates of instantaneous clock drift, they can require the use of multiple receivers in order to yield those estimates. Such reliance on multiple receivers, while accurate, can mean that obtaining accurate estimates of the clock drift can be expensive and time consuming as data must be collected on multiple receivers. The receivers then must be retrieved, and the data stored on them read and analyzed using the methods described in order to obtain an estimate of the drift for each clock. Underwater instruments are often expensive, and the deployment and recovery of these instruments can involve costly, time-consuming, and complex operations. Furthermore, the requirement to use multiple receivers can greatly extend the experimental time due to deployment, recovery, and servicing of these instruments. Another potential drawback of using a multireceiver system is the increased risk of failure. A system containing only one underwater receiver is generally more reliable than a system containing multiple receivers.

Since the source displacement is characterized in three dimensions (i.e., North, East, and Down), solving for the displacement (as described above) can require four or more receivers to ensure that the system of equations created by each receiver is over-determined. In other words, the requirement to have four or more receivers in a system to estimate clock drift can be simply to ensure that the errors of the source displacement solution can be estimated.

In one or more examples, rather than requiring multiple receivers to construct an over-determined system of equations, the method for estimating underwater clock drift can exploit "multipath" signals traveling through different portions of a water column, to generate an estimate for the clock drift on a single underwater instrument. In this way, rather than requiring multiple receivers to estimate clock drift, the method can use multiple arrivals that travelled through different parts of the water column recorded by a single receiver to estimate the clock drift.

In one or more examples, multipath can refer to one or more signals transmitted by a source that are reflected off a surface or bottom before being received at a receiver. In one or more examples, while a signal may propagate from a transmitter to a receiver directly (i.e., the direct arrival), the receiver may also receive multiple reflections of the signal, in which the transmitted signal has propagated from the source and has reflected off multiple surfaces before arriving at the receiver. These arrivals are also called eigenrays, since they resemble acoustic paths of energy travelling from the source to the receiver.

Figure 9:
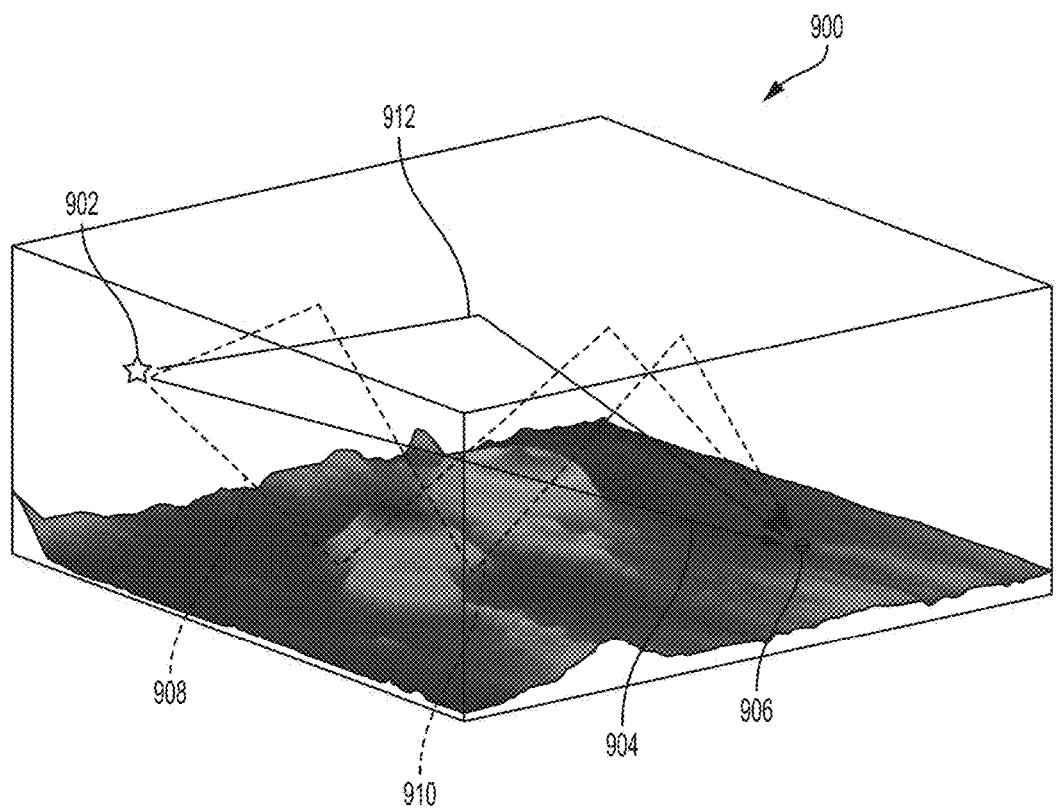
FIG. 9 illustrates an exemplary single receiver clock drift estimation system according to examples of the disclosure.

FIG. 9 illustrates an exemplary single receiver clock drift estimation system according to examples of the disclosure. In the example of FIG. 9, the system 900 can include a source 902 (that is substantially similar to the source 304). Similar to the source 304, source 902 can transmit BPSK M-sequences. In one example, the M-sequence can be 1,023 digits long. However, the disclosure should not be seen as limited to that length or the type of signal modulation used. In one example, the M-sequences can be sent at a data rate such that each digit consists of two cycles of the carrier frequency. The carrier frequency of the source 304 can vary depending on the source design, the geometry of the system, and environmental conditions. In some of the included examples, carrier frequencies of 77.5, 102.3, 155, 204.6, and 310 Hz are used. This disclosure, however, should not be seen as limited to the above-mentioned frequencies, nor should the disclosure been seen as limited to M-sequences.

The selection of the source's transmission frequency can take into account various trade-offs that occur in selecting a higher frequency signal versus a lower frequency signal. Higher frequency signals can attenuate at shorter ranges of propagation when compared to lower frequency signals. Thus, by selecting higher frequency, if the source is at substantial distance from the receiver (with multipath lengths being even longer than the travel path length of the direct arrival) the signal to noise ratio at the receiver may be too low to accurately detect the presence of a signal. On the other hand, if the selected frequency is lower, then positioning accuracy may be negatively impacted due to longer wavelength being used. Lower frequencies are more difficult to excite efficiently with underwater source requiring more power, thus requiring the use of larger and more expensive transmitters to ensure signals that will have an acceptable signal-to-noise ratio at the receiver. In one or more examples signals between 75 and 310 Hz can be transmitted by the source 902.

The system 900 can also include a receiver 906. The receiver 906 can operate in substantially similar manner as receiver 306a-f described above with respect to FIG. 3. Receiver 906 can be configured to receive signals that are transmitted by the source 902. The source 902, in one or more examples, can be an omni-directional or directional transmitter. In other words, the energy emanating from the source 902 (i.e., the transmitted signal) can propagate through different parts of the water column resulting in multiple arrivals at the receiver.

The signal transmitted by the source 902 can propagate towards the receiver 906 in an indirect manner, wherein the signal can reflect off the surface of the water and/or the seafloor before being received by the receiver 906. For example, path 912 illustrates a refracted-surface-reflected (RSR) travel path of the multipath arrival in which the signal transmitted from the source 902 travels to the surface of the water and is reflected back towards the receiver 906. Additionally, in one or more examples, the signal transmitted by the source 902 can propagate to the seafloor, where it can be reflected, and then propagate to the ocean surface, where it can again be reflected towards the receiver 906. This propagation path is illustrated by path 908 and can be known as a "surface-reflected-bottom-reflected" (SRBR) path. Finally, in one or more examples, the signal from the source 902 can propagate to the ocean surface, where it is then reflected towards the ocean floor, where it is then reflected again to the ocean surface, where it is then reflected toward the receiver. This type of path is illustrated by path 910 and can also be known as an SRBR path.

In terms of signal strength, the direct path (or more generally refracted-refracted (RR) path) 904 signal can be the strongest signal (provided such arrival exist in the given experimental geometry), while the reflected multipath signals (i.e., paths 908, 910, and 912) can have attenuated signal strength due to loss caused by the reflection at the ocean surface and/or ocean bottom. As an example, reflections off the ocean surface or the ocean bottom can cause significant distortions to the signals that ultimately arrive at the receiver 906 due to attenuation, scattering, and Doppler effects. In terms of arrival time, the direct path signal 904 can arrive first (since that signal can have the shortest geometric path), while the multipath signals 908, 910, and 912 can arrive later due to their longer path lengths. Under some conditions, however, especially in deep water and at long propagation ranges, the order of arrivals can change (i.e., the direct arrival could be, for example, the last to arrive). The present disclosure is not limited by the order of arrivals, as long as these arrivals are resolved, which is discussed below.

In order to exploit the multipath signals for the purpose of estimating clock drift, the multipath signals should be observable at the receiver and should further be resolvable (i.e., the multipath signals should not substantially overlap in time with the direct path signal 904 and with each other). However, isolating the multipath signals from the direct path signal (i.e., path 904) can be a challenge. Under many conditions, especially at shorter propagation ranges, the signal strength of the direct signal can be significantly greater than the signal strengths of the multipath signals (i.e., the signals propagating through paths 908, 910, and 912). In fact, generally, the signal strength of signal propagating through the direct path 904 will be greater than the strength of the signal propagating through the RSR path 912. Furthermore, the signal strength of the signal propagating through the RSR path 912 can be greater than the signal strength of the SRBR paths 908 and 910 since the SRBR paths undergo two reflections before arriving at the receiver. In a practical design, one should order the multipath arrivals according to their amplitude. This is done by analyzing the collected acoustic data and does not require accurate clock corrections.

Similar to the example of the four or more receiver systems for estimating clock drift described above, the source displacement along each eigenray corresponding to each multipath arrival can be estimated from a channel estimate. However, because multipath signals can be significantly weaker than direct signals (as described above), and because the arrivals can overlap in time with one another, estimating the channel for each signal received can be more complex.

In one or more examples, in order to accurately observe the direct signals and the multipath signals for the purpose of estimating the clock drift, the signals received at the receiver 906 can be analyzed to isolate and remove stronger signals so as to observe the weaker multipath signals. As discussed above with respect to FIGS. 5 and 6, one method for isolating a signal received at the receiver 906 is to estimate the channel along the path of interest and then estimate the signal contribution propagating through that path of interest for cancellation.

Figure 10:
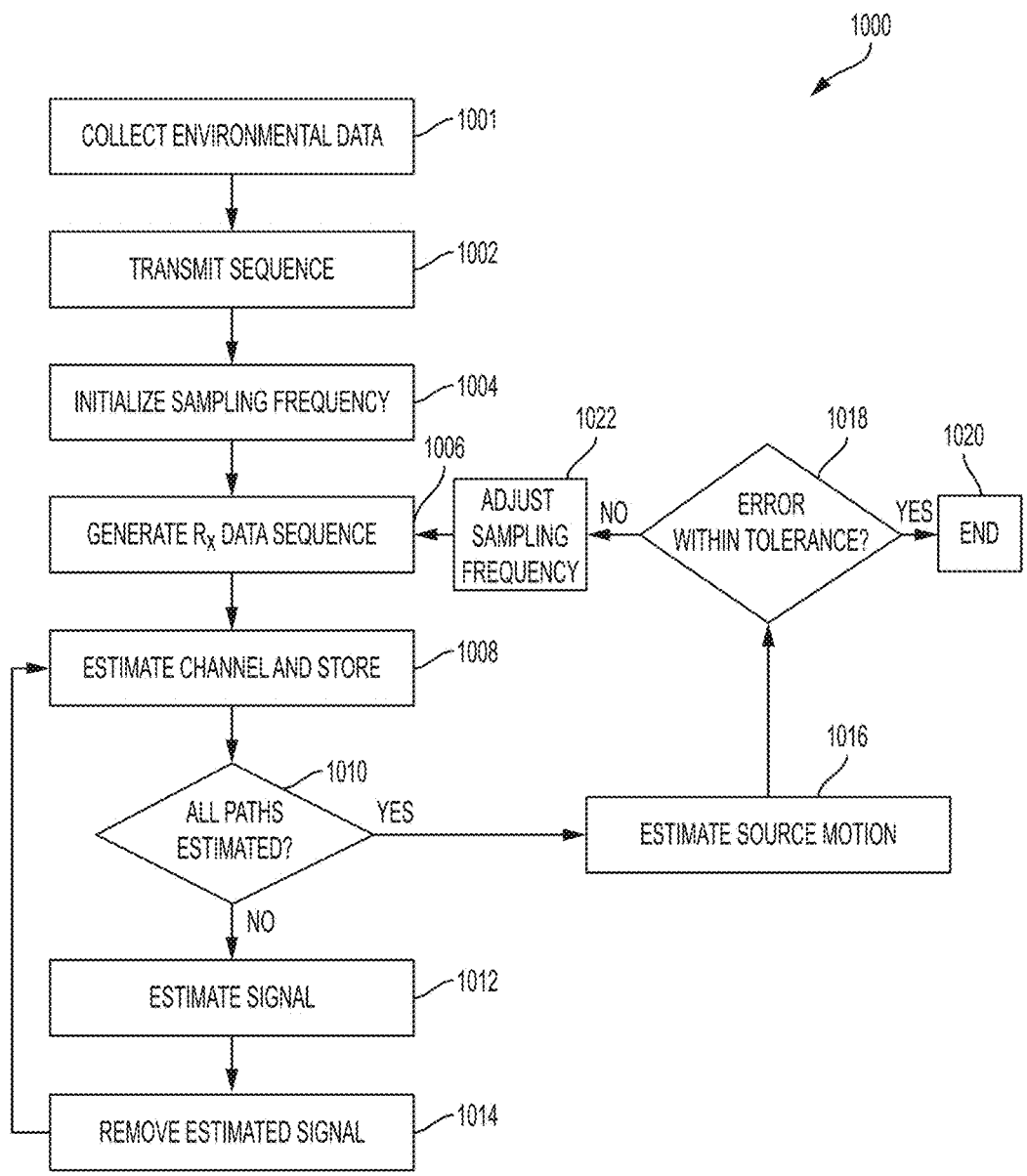
FIG. 10 illustrates an exemplary method for estimating clock drift of underwater devices in a single receiver system according to examples of the disclosure.

FIG. 10 illustrates an exemplary method for estimating clock drift of underwater devices in a single receiver system according to examples of the disclosure. Similarly, as with the system with four or more receivers, the method 1000 starts at step 1001, which collects environmental data, estimates the sound speed profile, and estimates the eigenrays, including multipaths, with ray-tracing propagation model. The method 1000 then continues at step 1002 wherein the source (i.e., source 902 of FIG. 9) can transmit a known sequence to receiver 906. Similar to the example of FIG. 3, the source 902 can transmit a waveform containing BPSK digital sequences. In one example, the M-sequence, 1023-digits long, can be transmitted. However, the disclosure should not be seen as limited to that length, modulation scheme used, or the type of the data sequence. In one example, the M-sequences can be sent at a data rate such that each digit consists of two cycles of the carrier frequency. The carrier frequency of the source 902 can vary depending on the source design, the geometry of the system, and environmental conditions, but in some examples the carrier frequencies are 77.5, 102.3, 155, 204.6, and 310 Hz. This disclosure, however, should not be seen as limited to the above-mentioned frequencies, nor should the disclosure be seen as limited to M-sequences. Any data sequence with any modulation scheme or any other waveform that might or might not contain digital data that allows for channel estimation on the time scales that are shorter than the characteristic time scale of the source motion can be used.

The data transmitted by the source 902 can be received at a receiver 906. When the receiver 906 is retrieved from the ocean, the memory associated with the receiver can be read so as to analyze the signals received from the source 902 during transmission of the M-sequences. Similar to the example of FIG. 5, this analysis can be performed as part of a post-processing analysis, meaning after the receivers have been retrieved from the ocean.

In order to analyze the received data, at step 1004, an initial sampling frequency is selected. Similar to the description of step 504 with respect to FIG. 5, the initial sampling frequency can be, in some examples, the nominal (i.e., with no drift) frequency of the clock located in the underwater instrument that contained the receiver. Unlike step 504, however, only a single receiver with the single clock is considered here.

Once an initial frequency has been selected at step 1004, the process can move to step 1006 wherein a received data sequence can be generated. Similar to the examples provided above, the memory of the underwater device can store a single digital value for each sample collected from the analog-to-digital converter. By selecting the initial sampling frequency at step 1004 (or adjusting the sampling frequency at step 1022), an output data waveform can be generated based on the sampling frequency and the values stored in the memory of the underwater device.

After generating the output waveform at step 1006, the process can move to step 1008 wherein an initial estimate of the channel is generated. Similar to the example of FIG. 5, the channel estimate can be represented as a tap-weight vector at time n using Eq. (4) provided above. The output data stream produced at step 1006 in conjunction with the known source data stream can be used to generate an estimate of the channel response using a conventional RLS estimation process. Furthermore at step 1008, the channel estimate can be stored for later analysis to estimate the source motion.

Unlike the case with multiple receivers, where the focus was on variations of travel time for direct arrivals, analysis of multipath energy is included here. The channel estimation, generally, allows identification of various multipath arrivals (RR, RSR, SRBR), but accurate extraction of channel variations along each multipath turns out to be difficult.

The variations in the strongest arrival (typically RR), generally, can be correctly computed from the channel estimation, but estimations of channel variations along any of the multipath arrivals require careful cancellation of all multipath arrivals that produce stronger arrivals than the one being analyzed. As described above, the multipath signals may be significantly weaker in terms of signal strength than the direct path signal. Thus, in the presence of the direct path signal 904, it may be challenging to generate channel estimates and source motion estimates along each of the multipaths since the errors (or sidelobes) from estimated direct path or stronger multipath signals may interfere with weaker multipath signals.

In one or more examples, in order to estimate the source motion along the directions of the propagation of multipath signals, the direct arrival signal 904 can be filtered out from the received signal. This is done by first estimating the channel variations corresponding to the direct arrival and then reconstructing the waveform contribution from the direct arrival. The reconstructed contribution can now be subtracted from the total transmitted waveform cancelling the energy propagating as a direct arrival. The process can now continue to the next multipath arrival until channel variations are estimated for all resolvable observed multipath arrivals. At this point the process moves to step 1010 wherein a determination is made as to whether channel estimates have been generated for all known paths. The number of signals (i.e., the direct path signals and multipath signals) can be determined a priori and can be based on the geometries between the source 902, the receiver 906, the ocean depth, and the environmental conditions. This is generally done by ray-tracing modeling and is confirmed experimentally. Thus, at step 1010, with a priori knowledge of the number of signals to be analyzed, a determination can be made as to whether a channel estimate for each signal path has been generated.

If it is determined that not all signal paths have been analyzed at step 1010, the method can move to step 1012, wherein the channel estimate generated at step 1008 can be used to generate an estimate of the signal received and for which a channel estimate was generated at step 1008. For instance, if the channel estimate generated at step 1008 was for the direct path signal, then at step 1012, the direct path signal can be estimated based on the channel estimate.

Once the signal has been estimated at step 1012, the process can move to step 1014, wherein the estimated signal calculated at step 1012 can be removed from the waveform generated at step 1006. By removing the estimated signal, the strongest signal that is within the received signals is substantially removed, thereby allowing for the weaker signals found within the received data to be analyzed. As discussed above, the direct path signal 904 can be the strongest. In one or more examples, the RSR signal path 912 can have the next strongest signal (because it only reflects once off the surface of the ocean) and finally the SRBR signals (908 and 910) can be the weakest since they reflect not only off of the surface but also the ocean bottom.

Once the estimated signal has been removed from the waveform, the signal that is left can be associated with the contributions from remaining multipaths. In other words, during the first pass through of steps 1008, 1010, 1012, and 1014, the signal analyzed beginning at step 1008 can be associated with the direct path signal 904 since that signal can be the strongest of the signals 904, 908, 910, and 912. During the second pass through of steps 1008, 1010, 1012, and 1014, with the direct path signal having been now removed, the signal analyzed at step 1008 can be associated with the RSR and SRBR signals with RSR contribution being the strongest. Thus, during the second pass through, the channel estimate generated at step 1008 can represent the channel for the RSR signal. The process steps 1008, 1010, 1012, and 1014 can then be repeated to generate a channel estimate for the RSR signal, generate a signal estimate for the RSR signal, and then remove the RSR signal from the overall received signal. The process can then be repeated for the remaining SRBR signals.

Finally, when all paths have produced an associate channel estimate, then at step 1010, the process can move to step 1016 wherein the source motion is estimated based on the generated channel estimates for each signal. As an initial step, the changes in path lengths (i.e., source displacements along each eigenray) can be estimated from the channel estimates at step 1016. However, in contrast to the example of FIG. 5, the path length changes estimated from the channel estimates can only be expressed in a two-dimensional plane (as opposed to a three-dimensional, north, east, and down expression as described above with respect to FIG. 5). Specifically, the path length changes can be expressed in a two-dimensional space that represents the vertical sagittal plane passing through the source 902 and the receiver 906. After generating the channel estimate for each path at step 1016, the path length changes as a function of time for each signal can be calculated. If the channel was constant (i.e., no environmental fluctuations and no source motion), the channel variation observed from the channel estimates calculated at step 1008 would be zero since the channel would not be varying. However, the channel estimate may vary due to motion of the source. Returning to the example of FIG. 9, if the source 902 moves during the transmission of the M-sequences (for instance due to motion of the ship), the distance between the source 902 and the receiver 906 may increase or decrease in two dimensions (either up or down or closer/farther away from the receiver). This increase or decrease can result in changes in each multipath signal travel time. Changes in travel time can be estimated from the generated RLS channel model by tracking a peak amplitude in the arrival of interest. To convert the changes in travel time into changes in path length, the calculated change in travel time can be multiplied by the sound speed at the source.

The sound speed at the source can be calculated using measured conductivity, temperature, and pressure at the source. As discussed above, the assumption is that the sound speed at the source does not change significantly over the duration of the transmission. Similar to the example of FIG. 5, this assumption can hold well for large horizontal displacement. However, it may break down if the vertical displacements (i.e., the depth of the source in the water) are very large. Since vertical displacements can be caused by the ship's heave and are thus related to the amplitude of the surface waves, the assumption of a constant sound velocity can provide a reliable estimate for a large variety of experimental conditions.

After calculating the change in the path length over time for each arrival (i.e., the direct path and the multipaths) at step 1016, the source displacements in the two-dimensional space defined by the vertical sagittal plane passing through the source 902 and the receiver 906 at each instant of time can be estimated.

Similar to the case with four or more receivers, each of these displacements $d_i$ can be resolved into its component vectors R, D (Range and Down) using the two-dimensional coordinate system. Equation (1) shown above is now modified for this two-dimensional case as follows:

$$R \cos \theta + D \sin \theta = d_i \qquad (13)$$

where d is the displacement along the eigenray and θ is the grazing launch angle as illustrated in FIG. 4. Similarly, Eq. (13) can be written for each eigenray. The difference with the prior case of four or more receivers is that now the Eq. (13) is written for multiple eigenrays corresponding to a single source-receiver pair. Thus, for each i-th eigenray, the mathematical relationship between the displacement along this eigenray $d_i$ and its two-dimensional component vectors R, D (also a function of time) can be described by Eq. (14) below:

$$(\cos\theta_i \quad \sin\theta_i)\begin{pmatrix} R \\ D \end{pmatrix} = d_i \tag{14}$$

Using the equations above, since there are two unknowns, which are the vertical displacement of the source (i.e. in the up/down direction) and the horizontal displacement of the source (i.e. towards and away from the receiver), and four equations, the system of equations is over-determined, and, thus, the unknowns can be solved for. In one or more examples, since there are only two unknowns, only three equations may be required to construct the required solution, and, thus, in addition to the direct path 904, only two multipath signals may need to have channel estimates generated, thus creating a system of equations with two unknowns and three equations. In practice, however, the larger number of multipaths used in the system results in a more robust solution, provided the multipath arrivals are observable (have good signal-to-noise ratio) and resolvable (do not overlap in time).

Alternatively, or in addition to, the examples described above, the clock drift value can be solved using a "brute force" method in which an initial value for the clock drift is selected (typically 0, i.e. no clock drift) and then the linear slopes of the misfit in the source motion as a function of time are computed for each eigenray. Unlike in the case with four or more receivers, in the case with one receiver, there is only one unknown clock rate drift. Therefore, "brute-force" search for the unknown clock rate drift becomes computationally feasible.

Once a least squares estimation of the unknowns has been calculated per step 1016, the process can move to step 1018, wherein an error (i.e., the misfit) of the estimation can be calculated. The misfit created by the least squares solution can allow for clock drift to be estimated similar to the method described with respect to step 514 described above with respect to the discussion of FIG. 6.

Once the error signal has been calculated at step 1018, the process can determine whether the slope of the error signal is within a desired tolerance similar to step 516 of FIG. 5. This pre-defined tolerance can be a value set by a user or can be empirically determined and can represent the amount of error associated with clock drift that a user of the process is willing to tolerate.

If the slope of the error curve is within the pre-defined tolerance, the process can be terminated at step 1020. However, if one or more curves are not within a predetermined tolerance, the process can move to step 1022, wherein the sampling frequency that was used to generate the received data at step 1006 is adjusted.

Once the sampling frequency is adjusted at step 1022, the process can be repeated starting with step 1006, wherein the channel is estimated assuming the new sampling frequency set at step 1022 and a new error signal is calculated using the new sampling frequency. The process can be repeated for as many iterations as it takes to get the slope of the error signal to be within the pre-defined tolerance.

Once the sampling frequency has been adjusted to a point where the slope of the error curve is within the predetermined tolerance, the sampling frequency used to bring the error curve into tolerance can be used to process the data collected by the underwater instrument so as to generate accurate reconstructions of the output waveforms, wherein any error associated with clock drift is mitigated or at least minimized.

Figure 11:
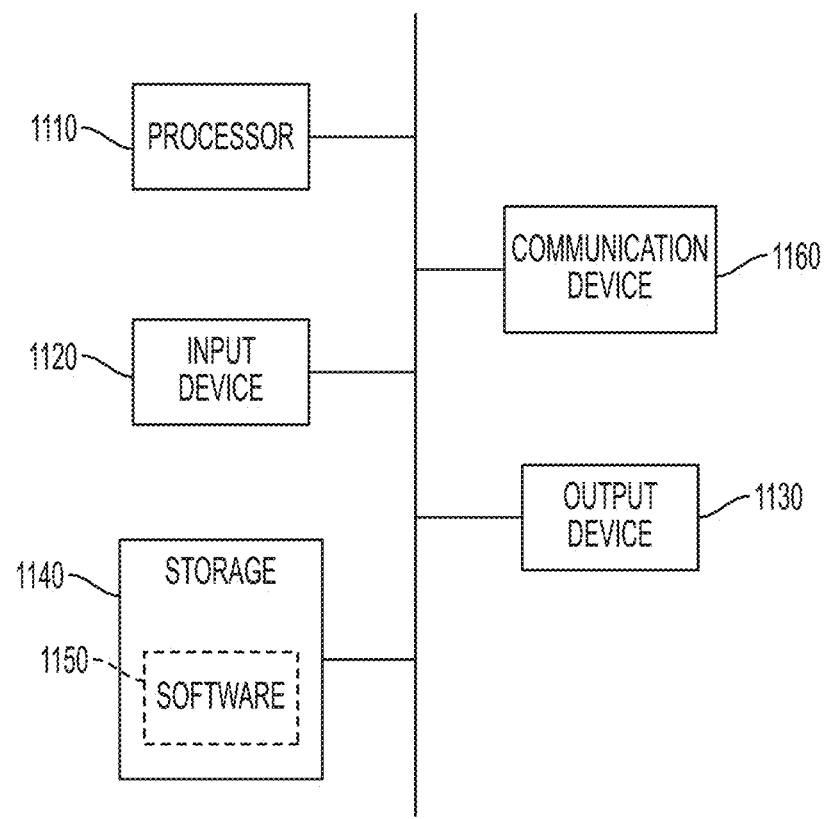
FIG. 11 illustrates an example of a computing device in accordance with one embodiment.

FIG. 11 illustrates an example of a computing device in accordance with one embodiment. Device 1100 can be a host computer connected to a network. Device 1100 can be a client computer or a server. As shown in FIG. 11, device 1100 can be any suitable type of microprocessor-based device, such as a personal computer, workstation, server, or handheld computing device (portable electronic device), such as a phone or tablet. The device can include, for example, one or more of processor 1110, input device 1120, output device 1130, storage 1140, and communication device 1160. Input device 1120 and output device 1130 can generally correspond to those described above and can either be connectable or integrated with the computer.

Input device 1120 can be any suitable device that provides input, such as a touch screen, keyboard or keypad, mouse, or voice-recognition device. Output device 1130 can be any suitable device that provides output, such as a touch screen, haptics device, or speaker.

Storage 1140 can be any suitable device that provides storage, such as an electrical, magnetic, or optical memory, including a RAM, cache, hard drive, or removable storage disk. Communication device 1160 can include any suitable device capable of transmitting and receiving signals over a network, such as a network interface chip or device. The components of the computer can be connected in any suitable manner, such as via a physical bus or wirelessly.

Software 1150, which can be stored in storage 1140 and executed by processor 1110, can include, for example, the programming that embodies the functionality of the present disclosure (e.g., as embodied in the devices as described above).

Software 1150 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1140, that can contain or store programming for use by or in connection with an instruction execution system, apparatus, or device.

Software 1150 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 1100 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 1100 can implement any operating system suitable for operating on the network. Software 1150 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

According to some examples of the disclosure, estimating clock drift includes selecting a sampling frequency, generating a plurality of output waveforms from a plurality of receivers, wherein each output waveform of the plurality of output waveforms corresponds to a receiver of the plurality of receivers, wherein the generated plurality of waveforms is based on the selected sampling frequency and data stored in each receiver of the plurality of the receivers, and wherein the data stored in each receiver of the plurality of receivers is based on data transmitted by a source to the plurality of receivers, generating a plurality of channel estimates from the plurality of generated output waveforms, wherein each generated channel estimate corresponds to an output waveform of the plurality of output waveforms, calculating a plurality of eigenray path lengths over time from the generated plurality of channel estimates, wherein each calculated eigenray path length corresponds to a receiver of the plurality of receivers, and wherein the calculated eigenray path lengths are based on the generated plurality of channel estimates, estimating a position of the source based on the plurality of eigenray path lengths, calculating a plurality of error signals, wherein each error signal corresponds to a receiver of the plurality of receivers, and wherein each error signal is based on an eigenray path length of the plurality of eigenray path lengths and the estimated position of the source; and determining if the plurality of error signals are less than a pre-determined tolerance.

According to some examples of the disclosure, a non-transitory computer readable storage medium having stored thereon a set of instructions for processing instructions of a software program that when executed by a computing device, causes the computing device to: select a sampling frequency, generate a plurality of output waveforms from a plurality of receivers, wherein each output waveform of the plurality of output waveforms corresponds to a receiver of the plurality of receivers, wherein the generated plurality of waveforms is based on the selected sampling frequency and data stored in each receiver of the plurality of the receivers, and wherein the data stored in each receiver of the plurality of receivers is based on data transmitted by a source to the plurality of receivers, generate a plurality of channel estimates from the plurality of generated output waveforms, wherein each generated channel estimate corresponds to an output waveform of the plurality of output waveforms, calculate a plurality of eigenray path lengths over time from the generated plurality of channel estimates, wherein each calculated eigenray path length corresponds to a receiver of the plurality of receivers, and wherein the calculated eigenray path lengths are based on the generated plurality of channel estimates, estimating a position of the source based on the plurality of eigenray path lengths, calculate a plurality of error signals, wherein each error signal corresponds to a receiver of the plurality of receivers, and wherein each error signal is based on an eigenray path length of the plurality of eigenray path lengths and the estimated position of the source; and determine if the plurality of error signals are less than a pre-determined tolerance.

In any of these embodiments, the data transmitted by the source to the plurality of receivers includes a plurality of BPSK M-sequences. In any of these embodiments, the plurality of channel estimates are generated using a recursive least squares channel estimation process. In any of these embodiments, calculating the plurality of eigenray path lengths over time includes calculating a plurality of delays over time based on the plurality of channel estimates, and wherein each delay over time corresponds to a channel estimate of the plurality of channel estimates. In any of these embodiments, the calculated plurality of eigenray path lengths over time is based on a speed of the data transmitted by the source. In any of these embodiments, estimating a position of the source based on the plurality of eigenray path lengths includes determining the position of the source with respect to three orthogonal coordinate planes. In any of these embodiments, estimating the position of the source based on the plurality of eigenray path lengths includes solving an overdetermined system of equations. In any of these embodiments, estimating the position of the source includes determining a least squares solution to the overdetermined system of equations. In any of these embodiments, each error signal has a slope, and wherein determining if the plurality of error signals are less than the pre-determined tolerance includes determining if the slope of each error signal is below the pre-determined tolerance. In any of these embodiments, if the plurality of error signals are greater than the pre-determined tolerance, the sampling frequency is adjusted. In any of these embodiments, the method further includes estimating the clock drift using the updated sampling frequency.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown but is to be accorded the widest scope consistent with the principles and features disclosed herein. Finally, the entire disclosure of the patents and publications referred in this application are hereby incorporated herein by reference.

What is claimed is:

1. A method for estimating clock drift, the method comprising:
    selecting a sampling frequency;
    generating a plurality of output waveforms from one or more receivers, wherein the generated plurality of waveforms is based on the selected sampling frequency and data stored in each receiver of the one or more receivers, and wherein the data stored in each receiver of the one or more receivers is based on data transmitted by a source to the one or more receivers;
    generating a plurality of channel estimates from the plurality of generated output waveforms, wherein each generated channel estimate corresponds to an output waveform of the plurality of output waveforms;
    calculating a plurality of path lengths changes over time from the generated plurality of channel estimates, wherein each calculated path length corresponds to a receiver of the plurality of receivers, and wherein the calculated path lengths are based on the generated plurality of channel estimates;
    estimating a position change of the source based on the plurality of path length changes;
    calculating one or more error signals, wherein each error signal is based on a path length of the plurality of path lengths and the estimated position of the source; and
    determining if the plurality of error signals are less than a pre-determined tolerance.

2. The method of claim 1, wherein the data transmitted by the source to the one or more receivers includes a plurality of BPSK M-sequences.

3. The method of claim 1, wherein the plurality of channel estimates are generated using a recursive least squares channel estimation process.

4. The method of claim 1, wherein calculating the plurality of path lengths over time includes calculating a plurality of delays over time based on the plurality of channel estimates, and wherein each delay over time corresponds to a channel estimate of the plurality of channel estimates.

5. The method of claim 4, wherein the calculated plurality of path lengths changes over time is based on a speed of the data transmitted by the source.

6. The method of claim 1, wherein estimating a position of the source based on the plurality of path lengths includes determining the position of the source with respect a plurality of orthogonal coordinate planes.

7. The method of claim 6, wherein estimating the position of the source based on the plurality of path lengths includes solving an overdetermined system of equations.

8. The method of claim 7, wherein estimating the position of the source includes determining a least squares solution to the overdetermined system of equations.

9. The method of claim 1, wherein each error signal has a slope, and wherein determining if the plurality of error signals are less than the pre-determined tolerance includes determining if the slope of each error signal is below the pre-determined tolerance.

10. The method of claim 9, wherein, if the plurality of error signals are greater than the pre-determined tolerance, the sampling frequency is adjusted.

11. The method of claim 10, wherein the method further includes estimating the clock drift using the updated sampling frequency.

12. A non-transitory computer readable storage medium having stored thereon a set of instructions for processing instructions of a software program that, when executed by a computing device, cause the computing device to:
    select a sampling frequency;
    generate a plurality of output waveforms from one or more receivers, wherein the generated plurality of waveforms is based on the selected sampling frequency and data stored in each receiver of the one or more receivers, and wherein the data stored in each receiver of the one or more receivers is based on data transmitted by a source to the one or more receivers;
    generate a plurality of channel estimates from the plurality of generated output waveforms, wherein each generated channel estimate corresponds to an output waveform of the plurality of output waveforms;
    calculate a plurality of path lengths changes over time from the generated plurality of channel estimates, wherein each calculated path length corresponds to a receiver of the plurality of receivers, and wherein the calculated path lengths are based on the generated plurality of channel estimates;
    estimating a position of the source based on the plurality of eigenray path lengths;
    calculate one or more error signals, wherein each error signal is based on a path length of the plurality of path lengths and the estimated position of the source; and
    determine if the plurality of error signals are less than a pre-determined tolerance.

13. The non-transitory computer readable storage medium of claim 12, wherein the data transmitted by the source to the plurality of receivers includes a plurality of BPSK M-sequences.

14. The non-transitory computer readable storage medium of claim 12, wherein the plurality of channel estimates are generated using a recursive least squares channel estimation process.

15. The method of claim 12, wherein calculating the plurality of path lengths over time includes calculating a plurality of delays over time based on the plurality of channel estimates, and wherein each delay over time corresponds to a channel estimate of the plurality of channel estimates.

16. The non-transitory computer readable storage medium of claim 15, wherein the calculated plurality of path lengths changes over time is based on a speed of the data transmitted by the source.

17. The non-transitory computer readable storage medium of claim 12, wherein estimating a position of the source based on the plurality of path lengths includes determining the position of the source with respect a plurality of orthogonal coordinate planes.

18. The non-transitory computer readable storage medium of claim 17, wherein estimating the position of the source based on the plurality of path lengths includes solving an overdetermined system of equations.

19. The non-transitory computer readable storage medium of claim 18, wherein estimating the position of the source includes determining a least squares solution to the overdetermined system of equations.

20. The non-transitory computer readable storage medium of claim 12, wherein each error signal has a slope, and wherein determining if the plurality of error signals are less than the pre-determined tolerance includes determining if the slope of each error signal is below the pre-determined tolerance.

21. The non-transitory computer readable storage medium of claim 20, wherein, if the plurality of error signals are greater than the pre-determined tolerance, the sampling frequency is adjusted.

22. The non-transitory computer readable storage medium of claim 21, wherein the method further includes estimating the clock drift using the updated sampling frequency.

* * * * *